Jan. 8, 1935.  C. P. OWENS  1,987,564
METER TESTING DEVICE
Filed Aug. 23, 1933
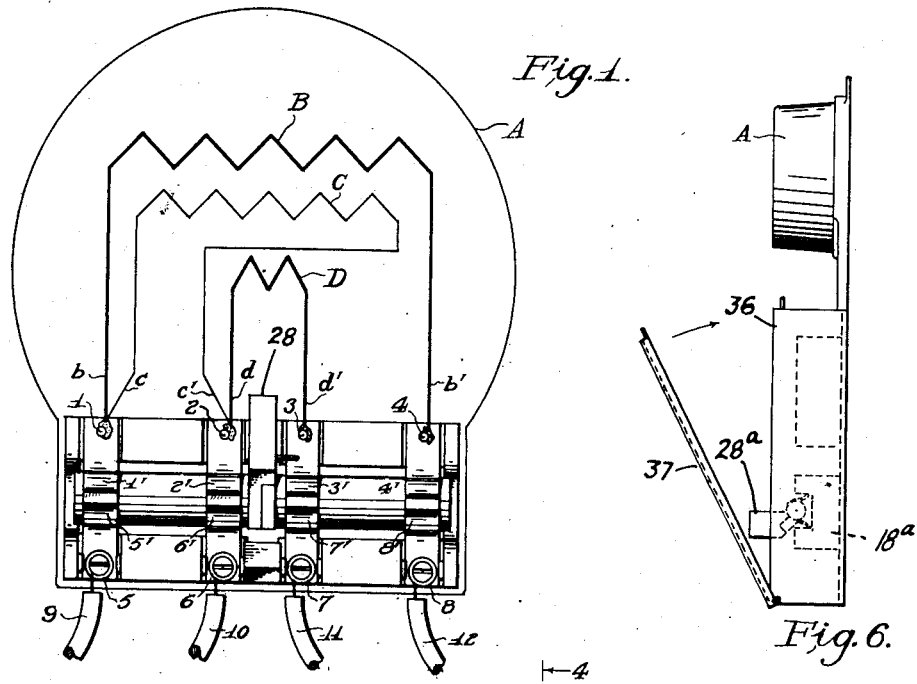
Fig. 1.
Fig. 6.
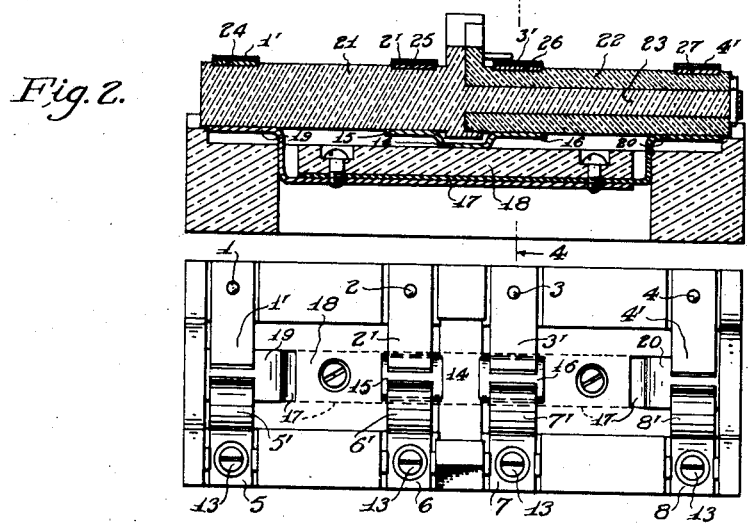
Fig. 2.
Fig. 3.
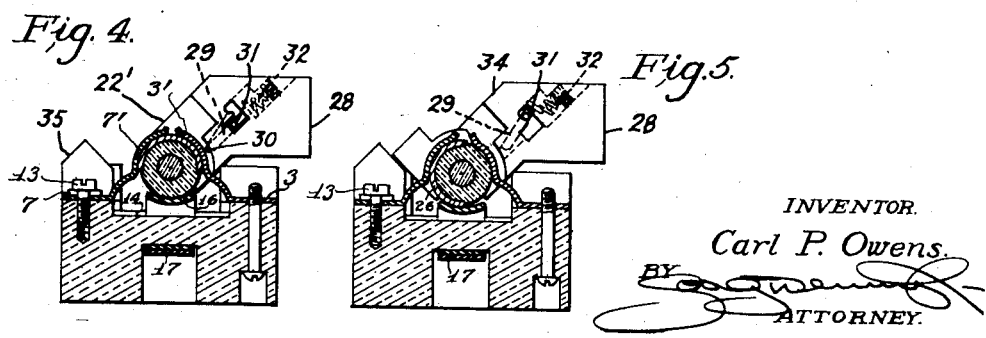
Fig. 4.  Fig. 5.
INVENTOR.
Carl P. Owens.
BY
ATTORNEY.

Patented Jan. 8, 1935

1,987,564

UNITED STATES PATENT OFFICE 1,987,564

METER TESTING DEVICE

Carl P. Owens, Glenside, Pa., assignor to Heinemann Electric Company, Trenton, N. J., a corporation of Pennsylvania Application August 23, 1933, Serial No. 686,463

8 Claims. (Cl. 175—183)

My invention is a meter testing device designed to permit the attachment thereto of line and load conductors of the circuit in the same sequence, viz., line, line, load, load, as is generally prevalent in meters not equipped with testing devices. My invention is further designed to provide for the testing of a meter without the physical detachment of any parts and without interrupting the flow of current from the line conductors to the load conductors. My invention will, however, permit the interruption of the flow of current from the line conductors to the load conductors, as well as interrupt flow through the meter, when desired.

The coils of an electric meter generally have their respective ends connected with terminals arranged in the sequence line, line, load, load. In accordance with my invention, each coil end is fixed to a terminal provided with a conducting wiper or curved blade adapted to make contact with a complementary conducting segment mounted on a shaft which may be composed of sections movable independently of one another or movable simultaneously by a handle. The handle is preferably permanently connected with one of the shaft sections and may be latched to or unlatched from the other shaft section.

The conducting segments on the shaft each makes contact with a conducting wiper or curved blade forming part of a terminal arranged in the sequence line, line, load, load, and adapted for the attachment of conductors of the line circuit and conductors of the load circuit.

The conducting segments adjacent to the ends of the shaft are movable, by the turning thereof, into conducting wiping engagement with terminals connected with a bar forming a conducting bridge through which the segments adjacent to the end of the shaft may be electrically connected. The intermediate segments on the shaft are movably, by the turning thereof, into siping conducting engagement with terminals on a bar conductor forming a conducting bridge through which such segments may be electrically connected; the bridges being insulated from one another.

The shaft is preferably divided into two concentric sections, one of which is telescoped over the other and a handle is fixed to one of such sections and makes latching connection with the other.

My testing mechanism may be incorporated in the meter itself or may be mounted on an insulating block housed in a casing or so-called "meter box" adjacent to and immediately below the meter, and, in each case, the handle may act as a stop to prevent the seating or closure of the cover for the meter or meter box when the shaft is in such position that the meter is not in circuit.

The characteristic features and advantages of my improvements will further appear from the following description and the accompanying drawing illustrating embodiments of my invention.

In the drawing, Fig. 1 is a front elevation of a meter, with its cover removed, and having my improved testing device applied thereto; Fig. 2 is a longitudinal sectional view through the testing device with the shaft and handle shown in position for connecting the meter in the circuit; Fig. 3 is a fragmentary plan view of the testing device with the shaft removed and showing the relationship of the fixed contacts of the device; Fig. 4 is a transverse sectional view on the line 4—4 of Fig. 2; Fig. 5 is a transverse sectional view similar to Fig. 4 but with the handle unlatched from one of the shaft sections and the parts in a dead position; and Fig. 6 shows a meter assembly in which the test device is housed in a meter test box below the meter proper, with the handle in position to prevent the closing of the test box door.

As illustrated in the drawing, the meter A is provided with coils B, C and D having their ends $b$, $b'$, $c$, $c'$, and $d$, $d'$ fixed to terminals 1, 2, 3 and 4 which are arranged in the sequence, beginning from the left in Fig. 1, of line, line, load, load.

Each terminal has a conducting blade projecting outwardly therefrom and forming the respective curved contact surfaces 1', 2', 3' and 4'. Complementary curved conducting surfaces 5', 6', 7' and 8' are formed by blades projecting upwardly from terminals 5, 6, 7 and 8, to which line conductors 9 and 10 and load conductors 11 and 12 may be secured by set screws 13. Or the terminals may be provided with tubular sockets in which the conductors are soldered or clamped.

A conducting bridge 14 is provided with curved bearing surfaces 15 and 16 respectively, aligned with and behind the conducting surfaces 2', 6', 3' and 7'. A conducting bridge 17, spaced from the bridge 14 by the non-conducting baseboard 18 of the meter, is provided with curved bearing surfaces 19 and 20 respectively aligned with and behind the bearing surfaces 1', 5', 4', 8'.

Each group of curved bearing surfaces 1', 19, 5', 2', 15, 6', 3', 16, 7' and 4', 20, 8' forms a seat providing journal bearings for a shaft of insulating material comprising the sections 21 and 22; the latter being sleeved on, and rotatable relatively to, an extension 23 of the shaft section 21.

The shaft section 21 has conducting segments 24 and 25 set in the periphery thereof and the section 22 has conducting segments 26 and 27 set in the periphery thereof. Each segment extends around somewhat more than one-half the periphery of the shaft, which is made of insulating material, so that the ends of the respective segments are spaced by insulating sections of the shaft.

When all of the segments occupy the same relative positions around the axis of the shaft, they may connect the terminals to which the line and load conductors are fixed with the terminals connected with terminals connected with the meter coils to permit measurement of current to the load lines and the measurement thereof. Or the shaft may be turned to connect the line terminals with the load terminals through the bridges to permit uninterrupted flow of current to the load lines while the meter is cut out of circuit for testing. In moving from one position to the other, the shaft segment may connect the line and load terminals with both the meter terminals and bridge terminals. To avoid arcing, the segments are preferably made of such lengths that they connect the complementary conductor terminals before disengaging the bridge terminals and connect the bridge terminals with conductor terminals before disconnecting complementary pairs of conductor terminals. The segments are, however, movable far enough to be disengaged from the bridge terminals or from the terminals to which the meter coils are connected.

When, however, the shaft section 22 is turned on its axis relatively to the shaft section 21, the terminals 5 and 6 connected with the line conductors may be connected with the meter coil terminals 1 and 2 when there is slight flow only through the actuating coil C, while the meter terminals 3 and 4 are connected with the bridge terminals 16 and 20 and there is no current flow to the load lines 11 and 12. Conversely, the shaft section 21 may be turned to connect the meter terminals 1 and 2 with the bridge terminals 19 and 15 and the shaft section 22 may be turned to connect the terminals 3 and 4 with the terminals 7 and 8 when there is no flow whatever.

The turning of the shaft may be effected by a handle permanently attached to either shaft section and detachably attached to the other shaft section by suitable latching mechanism. As shown, a handle 28 is fixed to the shaft section 21 and provided with a reciprocable bolt 29 movable into and out of the socket 30 in the lug 22' of the shaft section 22. The bolt is provided with a detent 31 by which the bolt may be retracted against the action of the coiled spring 32. The bolt may be held retracted against the action of the spring by engaging the detent 31 in the notch 33 of the handle 28.

The handle is provided with a shoulder 34 adapted to cooperate with a shoulder 35 on the base 18 to limit the movement of the handle and position its outer end in the path of the meter cover when the shaft is in position to disconnect the meter.

It will be understood that when the two sections of the handle are connected by the bolt 29 and the handle is turned to its "up" position, current flows principally through the line conductor 9 connected with the terminal 5 through the bearing 5', segment 24, bearing 1', terminal 1, meter coil B, terminal 4, bearing 4', segment 27, bearing 81, terminal 8 and load conductor 12 connected therewith to the load and then back through the load conductor 11 connected with the terminal 7, bearing 7', segment 26, bearing 3', terminal 3, meter coil D, terminal 2, bearing 2', segment 25, bearing 6', terminal 6, to the other line conductor 10. A shunt circuit also flows from the terminal 1 through the potential coil D to the terminal 2.

If the bolt be now retracted from its socket and the handle moved to its "out" position, the engagement of the segments 24 and 25 with the bearings 1' and 2' is broken, and there is no flow either through the meter or through the load circuit and the handle obstructs the attachment of a meter cover. If the handle is moved from its "up" to its "out" position while the bolt is engaged in its socket, so as to latch together the sections 21 and 22, the circuit through the meter is broken by the disengagement of the segments 24 and 25 from the bearings 1' and 2', and the disengagement of the segments 26 and 27 from the bearings 3' and 4', but the circuit through the load conductors is maintained since current may flow from the bearing 5', segment 24, bearing 19, bridge 17, bearing 20, segment 27, bearing 8', and terminal 8, and, after passage through the load conductors, back through the terminal 7, bearing 7', segment 26, bearing 16, bridge 14, bearing 15, segment 25, bearing 6', and terminal 6 to the return line conductor. In this position also, the handle 28 obstructs the attachment of the meter cover. If, however, the handle is moved to "out" position while latched to the shaft section 22, it may be then unlatched from the section 22 and moved back to "up" position so as to permit the attachment of the meter cover while the load lines are cut out of circuit.

As illustrated in Fig. 6, the conducting elements, instead of being mounted upon the insulating base 18 of the meter itself, are mounted upon an insulating block 18a provided with barriers projecting from the surface thereof between the elements of different potential. Such block may be mounted in the meter box 36 having a cover 37 whose closure is prevented by the shaft handle 28a when the latter is in its "out" position. In such construction the terminals 1, 2, 3 and 4 may be provided with screws and washers similar to those on the terminals 5, 6, 7 and 8 for the engagement of the bifurcated or yoked ends of conductors having their opposite ends connected with respective ends of the meter coils B, C and D; the terminals along both edges of the block being arranged in the sequence line, line, load, load.

Having described my invention, I claim—

1. Meter test mechanism comprising a base having thereon terminals arranged in the sequence line, line, load, load, a second set of terminals arranged in the sequence line, line, load, load, and adapted for connection with the coils of the meter, means comprising a rotor for connecting the line terminals first named with the load terminals first named in one position of the rotor, and connecting the line terminals first named with the complementary meter line terminals and the load terminals first named with the complementary meter load terminals in a different position of the rotor, said means including stationary bridges for connecting contacts carried by said rotor.

2. Meter test mechanism comprising a base having thereon terminals arranged in the sequence, line, line, load, load, a conducting bridge having terminals adjacent to the outer line terminal and the outer load terminal, a second conducting bridge having terminals adjacent to the intermediate line terminal and the intermediate load terminal, a second set of terminals arranged in the sequence line, line, load, load, and adapted for connection with the coils of a meter, and a shaft having thereon segments movable into position for connecting said first named line terminals and said first named load terminals with the terminals of said bridges or for connecting said first named line terminals with said second named line terminals and said first named load terminals with said second named load terminals.

3. Meter test mechanism comprising a base having thereon a series of terminals, a bridge having terminals adjacent to two of said first named terminals, a second bridge insulated from said first bridge by said base and having terminals adjacent to the other of said first named terminals, a second set of terminals, and a shaft provided with conducting segments movable to position for connecting together terminals of said first set with terminals of said second set or to position for connecting the terminals of said bridges with terminals of one of said sets.

4. Meter test mechanism comprising terminals adapted for connection with meter coils and terminals adapted for connection with line conductors and load conductors, a shaft having sections provided with conducting members for connecting terminals aforesaid, said shaft sections being movable independently of one another, and means for locking said shaft sections together and for moving said shaft sections simultaneously.

5. Meter test mechanism comprising a base having thereon a set of terminals, a second set of terminals substantially aligned with said first set of terminals, and a shaft comprising a plurality of independently movable sections, said sections each having thereon peripheral segments forming conducting members for connecting terminals of said first set with terminals of said second set.

6. The combination with a meter having a base and coils, of test mechanism comprising terminals mounted on said base and connected with said coils in the sequence line, line, load, load, conducting bearings connected with said terminals, a second set of terminals having conducting bearings substantially aligned with said first set of conducting bearings, conducting bridges having terminals substantially aligned with bearings first named and bearings second named, a shaft journalled in the seats formed by said bearings, said shaft having conducting members movable into position for connecting bearings of said first set with bearings of said second set or for connecting bearings of said second set with said bridge bearings.

7. Meter test mechanism comprising a base having connected therewith line terminals and load terminals arranged in the sequence line, line, load, load, and meter terminals arranged in the sequence line, line, load, load, insulated barriers projecting from said base and disposed between the terminals of substantially different potential, a shaft having conducting members rotatable by said shaft into position for connecting said line and load terminals with the complementary meter terminals, and bridging members positioned for engagement by said shaft members to connect said line terminals with said load terminals when such terminals are disconnected from their complementary meter terminals.

8. Meter test mechanism comprising an insulating base, line terminals and load terminals arranged in the sequence line, line, load, load, meter terminals complementary to said line and load terminals and arranged in the sequence line, line, load, load, insulating barriers projecting upwardly between said base between the terminals of substantially different potential, and means comprising a shaft having thereon peripheral conducting segments for making and breaking conducting connection between said line terminals and said load terminals, and said meter terminals complementary thereto.

CARL P. OWENS.